(12) United States Patent
Herrig et al.

(10) Patent No.: US 11,614,076 B2
(45) Date of Patent: Mar. 28, 2023

(54) DEVICES AND METHODS FOR DETERMINING DEFLECTION OF ROTOR BLADES OF A WIND TURBINE

(71) Applicant: General Electric Renovables Espana, S.L., Barcelona (ES)

(72) Inventors: Andreas Herrig, Garching (DE); Marc Canal Vila, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/510,702

(22) Filed: Oct. 26, 2021

(65) Prior Publication Data

US 2022/0128039 A1   Apr. 28, 2022

(30) Foreign Application Priority Data

Oct. 27, 2020   (EP) .................................... 20382932

(51) Int. Cl.
F03D 17/00   (2016.01)

(52) U.S. Cl.
CPC .......... F03D 17/00 (2016.05); *F05B 2270/17* (2013.01)

(58) Field of Classification Search
CPC .............................. F03D 17/00; F05B 2270/12
See application file for complete search history.

(56) References Cited

U.S. PATENT DOCUMENTS

| | | | | |
|---|---|---|---|---|
| 3,897,995 A | * | 8/1975 | Penn ...................... | G01B 9/021 356/458 |
| 2010/0084864 A1 | * | 4/2010 | Lucks .................. | F03D 7/0288 290/44 |
| 2011/0135466 A1 | * | 6/2011 | Latorre .................. | F03D 17/00 416/61 |
| 2012/0050750 A1 | * | 3/2012 | Hays ........................ | G01P 5/26 356/519 |

(Continued)

FOREIGN PATENT DOCUMENTS

| | | | | |
|---|---|---|---|---|
| CN | 110886679 A | | 3/2020 | |
| EP | 2581762 A1 | * | 4/2013 | ............. F03D 17/00 |

(Continued)

OTHER PUBLICATIONS

European Search Report Corresponding to EP20382932 dated Apr. 12, 2021.

*Primary Examiner* — Courtney D Heinle
*Assistant Examiner* — Ryan C Clark
(74) *Attorney, Agent, or Firm* — Dority & Manning, P.A.

(57) ABSTRACT

The present disclosure relates to methods and systems for measuring deflection of blades of a wind turbine. Examples include a light emitting and collection device mounted to the nacelle and configured to emit light in a direction within a substantially vertical plane. Examples include a method for operating a wind turbine including emitting light above a hub, receiving the light when reflected by a blade of the wind turbine, and, if the level of blade deflection is above a threshold, reducing blade loading of the blade before the blade reaches a vertically downward position. Examples (Continued)

include a method for monitoring deflection of a rotor blade of a wind turbine comprising emitting a light sheet, collecting reflections of the emitted light, and determining deflection of the rotor blade by determining a time during which the blade reflects the emitted light sheet.

17 Claims, 8 Drawing Sheets

(56) References Cited

U.S. PATENT DOCUMENTS

| | | | | |
|---|---|---|---|---|
| 2013/0287567 | A1* | 10/2013 | Olesen | F03D 7/0288 |
| | | | | 416/61 |
| 2015/0159632 | A1* | 6/2015 | Vangen | F03D 7/04 |
| | | | | 416/61 |
| 2018/0171984 | A1* | 6/2018 | David | F03D 7/0224 |

FOREIGN PATENT DOCUMENTS

| | | | | |
|---|---|---|---|---|
| WO | WO-2014090903 A1 * | 6/2014 | | F03D 17/00 |
| WO | WO2018107298 A1 | 6/2018 | | |

* cited by examiner

DEVICES AND METHODS FOR DETERMINING DEFLECTION OF ROTOR BLADES OF A WIND TURBINE

The present disclosure relates to devices and methods for monitoring deflection of a rotor blade of a wind turbine. More particularly, the present disclosure relates to devices and methods for monitoring deflection of a rotor blade of a wind turbine using light.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or by a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

A tendency in the wind turbine field is to increase the hub height and to increase the length of the blades in order to capture more energy of the wind. With an increased length of the blades, they become more flexible as well.

The loads on the wind turbine blades should generally be high enough to produce as much as energy as possible, but not as high to overcome deflection or strain limits for the blades. If the wind turbine blades deflect or bend in excess, e.g. due to wind gusts, they could hit the wind turbine tower and even break. These risks increase with the length of the blades. And also to reduce direct material cost, the tendency is to build the blades as light (and therefore flexible) as possible.

It is known to sense a tip of a wind turbine blade so that a blade tip clearance, i.e. a distance between the blade tip and the wind turbine tower, may be calculated and adjusted to avoid breaking of the blade or to avoid the blade hitting the tower. However, already existing blade tip sensing methods and devices may not be reliable enough or may require complicated and expensive equipment. For instance, installing instrumentation on the blade tips may be necessary. In some cases, information collected about the blade tip position may be obtained too late for avoiding blade damage.

Examples of the present disclosure provide devices and methods for determining deflection of (a tip of) a rotor blade of a wind turbine that use light and that at least partially resolve the aforementioned problems.

SUMMARY

In a first aspect of the present disclosure, a wind turbine comprising a tower, a nacelle on top of the tower, a rotor hub with one or more rotor blades rotatably mounted to the nacelle and a first light emitting and collecting device mounted to the nacelle is provided. The first light emitting and collecting device is configured to emit light in a direction within a substantially vertical plane and to collect a reflection of the emitted light by one of the rotor blades; and the first light emitting and collecting device is mounted to the nacelle at a horizontal distance of the tower such that a tip of a blade is detected before or when it exceeds a blade deflection limit.

In accordance with this aspect, a wind turbine is provided with a simple device that, by emitting light and collecting reflections of the previously emitted light in a direction within a substantially vertical plane, may be able to avoid excessive blade deflection, and thus blade breaking and/or blade impact with the wind turbine tower.

Throughout this disclosure, a light emitting and collecting device may be understood as a set of at least a light source element and a light receiving element. These light emitter and light sensor may be located together, e.g. inside a case or apparatus that contains them such as a laser distance meter; or may be separate elements, e.g. the light sensor may be a camera and the light emitter may be a laser or a light-emitting diode (LED). If the light emitter and the light sensor belong to a same apparatus, they may be controlled in a dependent manner, i.e. they may share a control processing unit (CPU) and a memory. If the light emitter and the light sensor are separate elements, they may not share a CPU and a memory. In this case, an additional device such as a controller placed in the nacelle may gather data from both elements and operate with this data. In some examples the emitter and sensor may be interlinked and able to communicate with each other, if needed, to control e.g. the emission of light at specific times and/or frequencies or perform function checks.

A blade deflection limit or blade deflection threshold may be understood as a deflection or strain limit over which the risk of a wind turbine blade break, or the risk of collision with the wind turbine tower or in general blade damage is higher than acceptable.

Herein, horizontal distance may be understood as a distance measured along a length of the nacelle. If the light emitting and collecting device is mounted to the bottom of the nacelle, a horizontal distance may refer to the distance between this device and the wind turbine tower along a length of the nacelle. The suitable distance depends on the tip clearance by tower geometry. If the light emitting and collecting device is mounted to the top of the nacelle, a horizontal distance may refer to the distance, along a length of the nacelle, between this device and a tower measured along an axis between the rotational axis of the nacelle and the rotor hub.

Vertical direction may be understood as a direction substantially parallel to the wind turbine tower in the absence of movement of the tower, e.g. in the absence of tower nodding. A vertical plane may be understood as a plane including such vertical direction.

In a further aspect, a method for operating a wind turbine having a first light emitting and collecting device mounted to a nacelle is provided. The method comprises emitting light above a hub of the wind turbine and receiving the light when reflected by a blade of the wind turbine. The method further comprises, if a level of blade deflection based on the received reflected light is above a threshold, reducing blade loading of the blade before the blade reaches a vertically downward position.

Emitting light above a hub may be understood as emitting light between 9 o'clock and 3 o'clock, wherein 9 o'clock and 3 o'clock refer to a position of a wind turbine blade (e.g. 6 o'clock refers to the blade pointing downwards).

In yet a further aspect, a method for monitoring deflection of a rotor blade of a wind turbine, wherein a first light emitting and collecting device is mounted to the nacelle of the wind turbine is provided. The method comprises emitting a light sheet; collecting reflections of the emitted light; and determining deflection of the rotor blade by determining a time during which the blade reflects the emitted light sheet.

In accordance with this aspect, blade deflection may not be only detected, but the time of interference of the blade with the light sheet may be used to better adjust the mechanisms of blade load reduction. The operation of the wind turbine blade may then be optimized by achieving an adequate compromise between blade load reduction and keeping an energy production as high as possible.

Herein, a "light sheet" may be understood as a beam of light having a higher degree of divergence, i.e. which is not collimated. Conversely, herein the term "light beam" may be understood as a beam of light which has a lower degree of divergence, i.e. it is substantially collimated. Therefore, the difference between a light beam and a light sheet as used throughout this disclosure may be divergence or collimation.

As a visual example, a set of light rays substantially parallel among them and having a substantially constant width along the length of the set of rays (i.e. the rays are substantially collimated or have substantially no divergence) may be considered a light beam, but a set of light rays whose width increases with the distance from the source of emission (i.e. the rays are not collimated and show divergence) may be considered a light sheet. Therefore, a light beam may be visualized as a set of light rays traveling substantially in one direction and a light sheet may be visualized as a light plane, in the sense that the light rays of the light sheet may be visualized as traveling in more than one direction within a plane due to divergence of the light rays.

Thus, herein a light beam may for example be emitted from a light source with an angle of less than 0.5° and a light sheet may for example be emitted from a light source with an angle equal to or greater than 0.5°.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
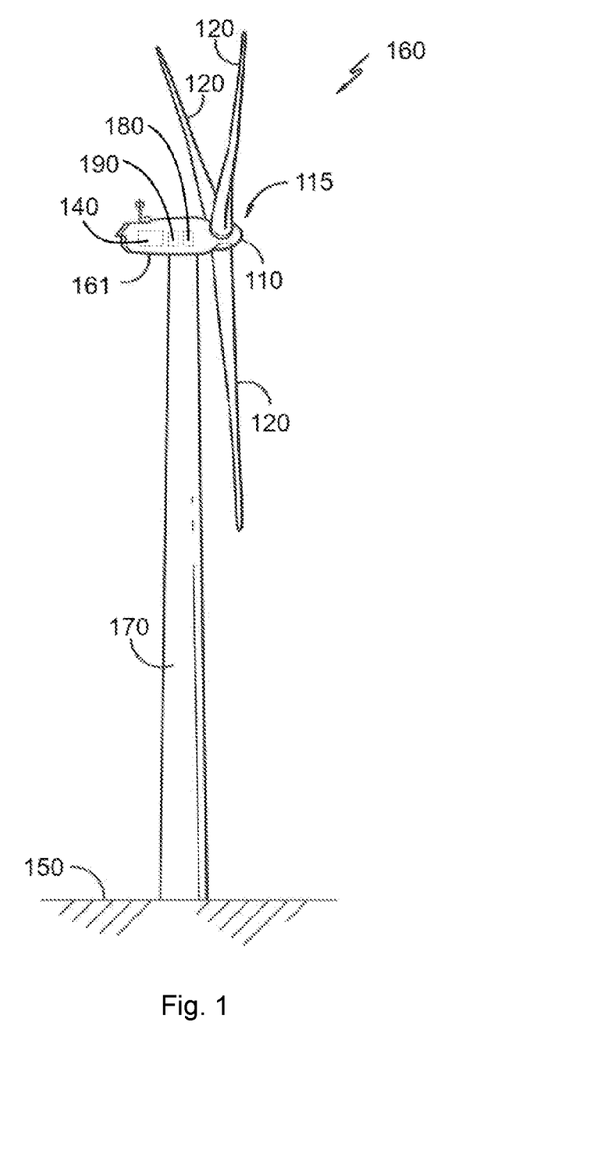
FIG. 1 illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
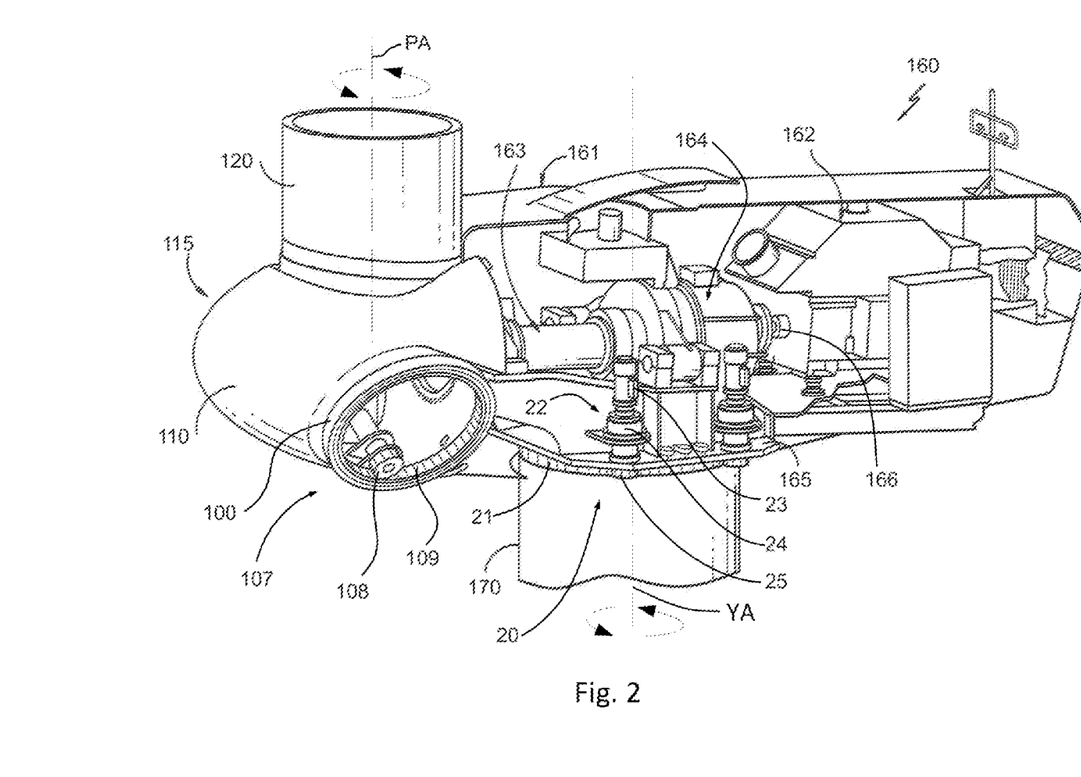
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

Figure 3:
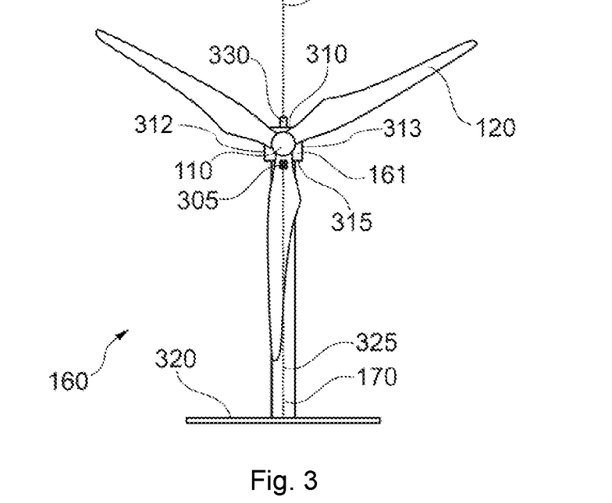
FIG. 3 schematically illustrates a front view of an example of a wind turbine.

FIG. 3 schematically illustrates a front view of an example of a wind turbine including a light emitting and collecting device. Similarly to the indicated with respect to FIG. 1, the wind turbine 160 comprises a tower 170, a nacelle 161 on top of the tower 170 and a rotor hub 110 with at least one rotor blade 120 rotatably mounted to the nacelle 161. The wind turbine 160 also comprises a first light emitting and collecting device (LECD) 305 mounted to the nacelle 161, e.g. to a top 310 or a bottom 315 of the nacelle 161 in FIG. 3. In particular, the wind turbine 160 of FIG. 3 includes three blades 120 and two LECDs, a first LECD 305 mounted to the bottom 315 of the nacelle 161 and an additional LECD 330 mounted to the top 310 of the nacelle 161.

In general, there may be any number of LECDs mounted to any side of the nacelle 161. A nacelle 161 may have a top side 310, a bottom side 315, a front or upstream side 915, a back or downstream side 910 and two lateral sides 312, 313. The lateral sides 312, 313 may be thus substantially parallel to a length of the nacelle 161 and may extend from the front 915 of the nacelle 161 to its back 910 without being the top 310 and the bottom 315 of the nacelle 161. In the example of FIG. 3, any number of LECDs may be mounted to the bottom 315 of the nacelle 161 and any number of LECDs may be mounted to the top 310 of the nacelle 161. In these or some other examples, one or more LECDs may be mounted to any of the lateral sides 312, 313 of the nacelle 161. This may be particularly useful when an LECD emits light above a hub 110, e.g. upwards, in order to detect excessive blade deflection before the blade 120 passes in front of the tower 170. The mounting at lateral sides of the nacelle 161 may be an option available for all the examples throughout this disclosure.

The first LECD 305 is configured to emit light in a direction within a substantially vertical plane and to collect a reflection of the emitted light by one of the rotor blades. In some examples, the first LECD 305 is configured to emit light in a substantially vertical direction, e.g. upwards or downwards. As shown in FIG. 3, the first LECD 305 is emitting light downwards and it may collect the reflected light coming up which has been reflected on the ground 320. In some examples the ground 320 may correspond to the support surface 150 of FIG. 1. However, in circumstances, the blades may deform to such an extent that at least a tip of the blades reaches a position in which the light beam from LECD 305 to the ground is intercepted and reflected.

In some examples, the ground 320 and/or particles in the air, e.g. in dusty or foggy conditions, may absorb part of the emitted and/or reflected light, thereby complicating the detection of one or more reflections of the emitted light. In order to facilitate detection of light reflected by the ground 320, the emitted light may be split, e.g. in two portions, such that each portion may be detected by different light sensors. In an example, the first LECD 305 may include two light receiving elements, e.g. a main light sensor and a secondary light sensor, for this purpose. In another example, a secondary light receiving element may be provided as an element not belonging to the first LECD 305. In both examples, the secondary sensor may be used to indicate a fault or confirm the correct functioning of the light emitter and/or main light sensor.

Figure 4:
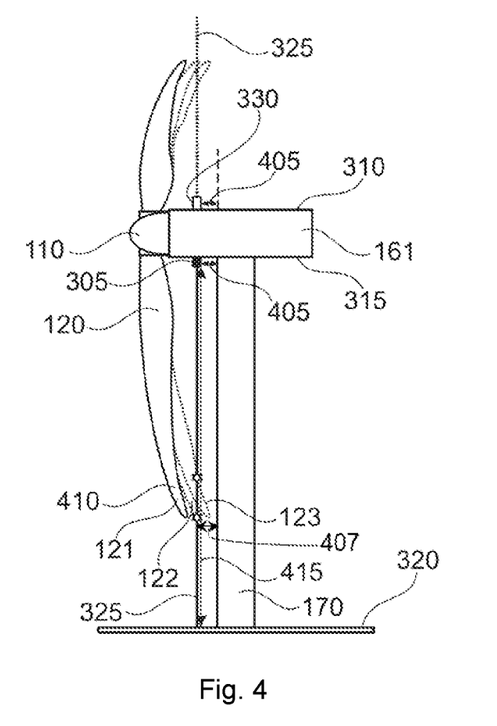
FIG. 4 schematically illustrates a side view of the wind turbine of FIG. 3.

FIG. 4 schematically illustrates a side view of the wind turbine of FIG. 3. As shown in FIG. 4, the first LECD 305 is mounted to the nacelle 161 at a horizontal distance 405 of the tower 170 such that a tip 410 of a blade 120 is detected before or when it exceeds a blade deflection limit. The detection of a tip 410 of a blade 120 may thus warn that the blade 120 may be too close to the tower 170 such that the blade 120 may hit the tower 170. Therefore, precautionary actions may be taken to avoid such a collision, or in general avoid blade 120 damage.

The first LECD 305 may be configured to emit a substantially collimated light beam 325. The first LECD 305 may include one or more lenses to obtain a collimated light beam 325. The first LECD 305 may also be configured to measure a distance within a substantially vertical plane distance 415 between the first LECD 305 and a position of a reflection. In some examples, the first LECD 305 may be configured to obtain a position of the place where one or more reflections occur. A distance within a substantially vertical plane may be a substantially vertical distance 415 in some examples. In some other examples, a distance within a substantially vertical plane may be a substantially horizontal distance. Still in some other examples, a distance within a substantially vertical plane may be a distance within the substantially vertical plane which has an angle (greater than 0°) with respect to any of a vertical direction or a horizontal direction.

In FIGS. 3 and 4, light may be reflected on the ground 320. The measurements of a vertical distance 415 may be registered and recorded on a memory of the first LECD 305. In an example, the first LECD 305 may be a laser distance meter.

Figure 5:
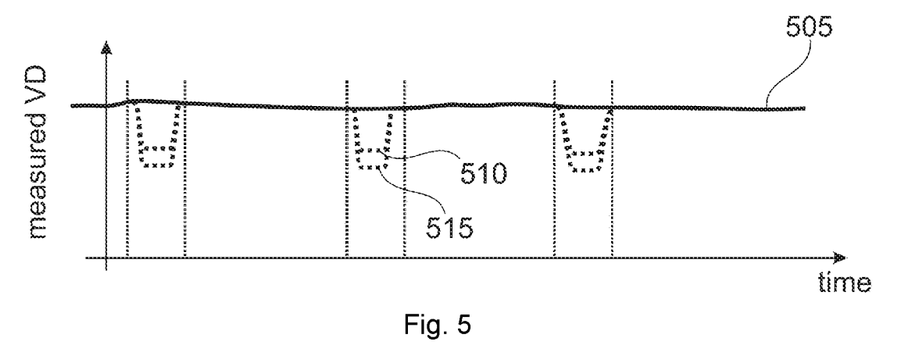
FIG. 5 schematically depicts an example of an evolution of a vertical distance measured by a light emitting and collecting device (LECD) of any of FIGS. 3 and 4.

FIG. 5 schematically depicts an example of an evolution of a measured vertical distance 415, i.e. the distance representing a distance between the LECD and the point of reflection in this particular example, over time. The following thus may apply when a distance between the LECD and the position of a reflection of the emitted light is not a vertical distance. A vertical distance 415 (VD) may be measured indirectly. For instance, the first LECD 305 may quantify the time that an emitted collimated light beam 325 takes to hit the ground 320 and then be reflected and be detected by the first LECD 315. This time value may then be converted into a vertical distance 415 value.

Each of the lines 505, 510, 515 represent a plurality of measured vertical distances 415. The case of line 505 represents the case where no interference between the light beam 325 and a blade 120 has been detected. This is why the measured vertical distance 415 gives a substantially constant value over time.

However, the other two lines 510, 515 illustrate cases where blade 120 interference with the light beam 325 has been detected. Such an interference causes a reduction in the measured vertical distance 415. Thus, three interferences are shown in FIG. 5. Lines 505, 510, 515 may correspond to the evolution of the blades in cases 121, 122, 123 of FIG. 4 respectively. In the case of deflection 121, the blades do not interfere with the light beam 325 whereas interference takes places for cases 122, 123.

In addition, the variation (drop) in vertical distance 415 may be correlated with blade deflection (e.g. with a distance 407 between the blade 120 and the tower 170, see FIG. 4), and used for deciding which measures of load reduction to take. For example, different measures of load reduction may be implemented for the cases of lines 510 and 515. In some examples, even if the blade reflects the light no measures are necessary. In other examples, operational changes such as pitching or reducing rotor speed may be made. Also, actions may be taken immediately after detecting an interference or may be taken after several blade passes and/or blade interferences, e.g. depending on how large the deflection of a blade 120 may be.

For instance, in some examples, reducing blade loading may be performed after having monitored multiple passes of the same blade 120. In some of these examples, statistical evaluation of the interference of a blade 120 with the light emitted by the first LECD 305 over time may be performed to decide whether to react or not, and if reacting, how. In some other examples, a single pass, e.g. a single interference event of a blade 120 with the emitted light, may be used for deciding whether to react, and in which way. These options may be combined, e.g. one of them may be used during a certain period of time and the other one may be used during a later or at least partially overlapping period of time.

If blade deflection is acceptable, e.g. if one or more blades 120 are not detected during a period of time, power of operation may be increased in some examples. In some of these examples, power may be increased beyond the nameplate rating.

Mounting a first LECD 305 configured to emit a light beam 325 and collect its reflection may be an easy and not expensive way of detecting blade 120 deflection. In addition, it may be a convenient way as compared to prior art systems which employ specific equipment on a blade tip 410 or on the tower 170.

In some examples, the blades may include a paint or coating at least in a section including the blade tip to ensure effective reflection of the light emitted by the LECD.

FIGS. 3 and 4 also illustrate an LECD 330 mounted to the top 310 of the nacelle 161. In this case, as the LECD 330 emits light above a hub 110, e.g. upwards, a distance between the LECD 330 and the place where a reflection occurs, e.g. a vertical distance, may only be measured when a blade 120 interferes with the light beam 325. Such a measurement may trigger preventive actions, which may be adapted depending on the magnitude of the measured vertical distance.

The values of measured distance, e.g. an upwards vertical distance, may help to anticipate a possible collision between a blade 120 and the tower 170 and reduce a blade load in order to avoid it.

Figure 6:
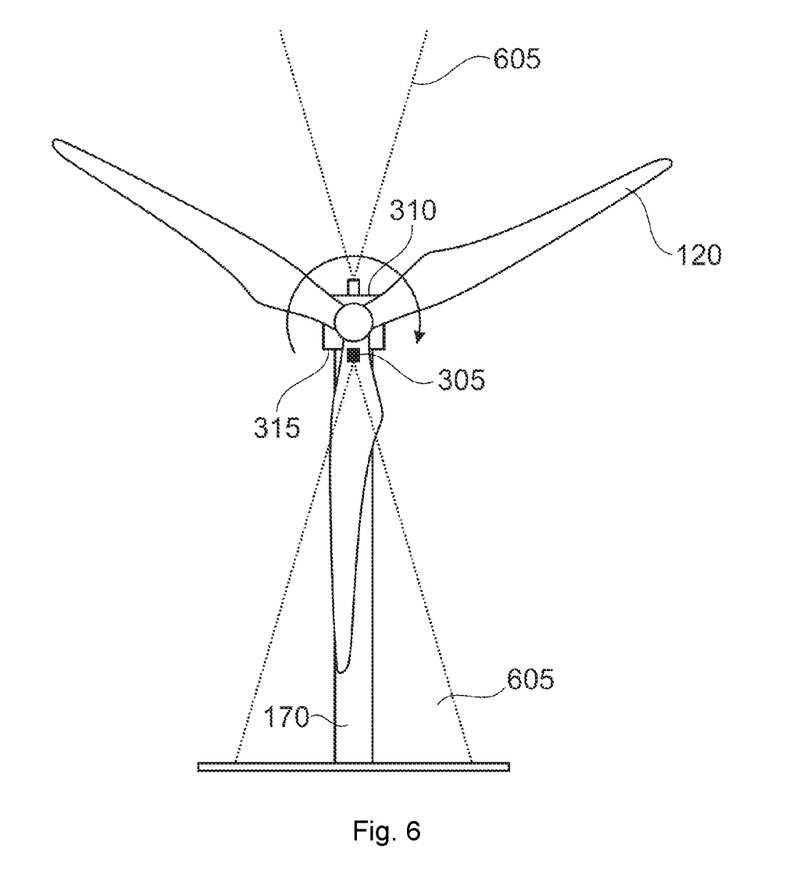
FIG. 6 schematically illustrates a front view of another example of a wind turbine.

FIG. 6 schematically illustrates a front view of another example of a wind turbine including a light emitting and collecting device. In the example of FIG. 6, the first LECD 305 is configured to emit a light sheet 605. In an example, a light sheet 605 may be generated by a cylinder lens diverging a light beam. In another example, a light sheet 605 may be generated by a rotating or vibrating mirror which rapidly deflects a light beam, covering a certain angle in a substantially negligible time. A light sheet 605 may, in some examples, be emitted in a substantially vertical direction. Other directions of emission may be used in some other examples.

The first LECD 305 or a processor coupled to the first LECD may also be configured to measure an intensity of the received light. I.e., the first LECD may emit light 605 and receive light, wherein the received light may partially include reflections of the emitted light 605. If a blade 120 does not interfere with the light sheet 605, the received intensity does not change. However, if a blade 120 intersects with the light sheet 605, it may increase light reflection and scattering, and thus increase the received light by the first LECD 305. Thus, the first LECD 305 may detect that a blade 120 is interfering with the light sheet 605 and that preventive actions may need to be implemented to avoid an excessive blade deflection.

Herein, a change in light intensity may be understood as a variation, e.g. an increase, of an amount of light with respect to a previously received amount of light.

In some examples, a modulation technique may be used to discriminate between blade 120 intersection and other undesired detections which may give rise to false positives, e.g. birds or flying plastic bags. In this case, intensity may be time averaged and pulse frequency filtered. In some examples, color filtering, or in general wavelength filtering, may be used to help in this regard. Still in some examples, a rotor position and/or a rotor speed may allow to discern between intensity variations detected and discard undesired detections.

Figure 8:
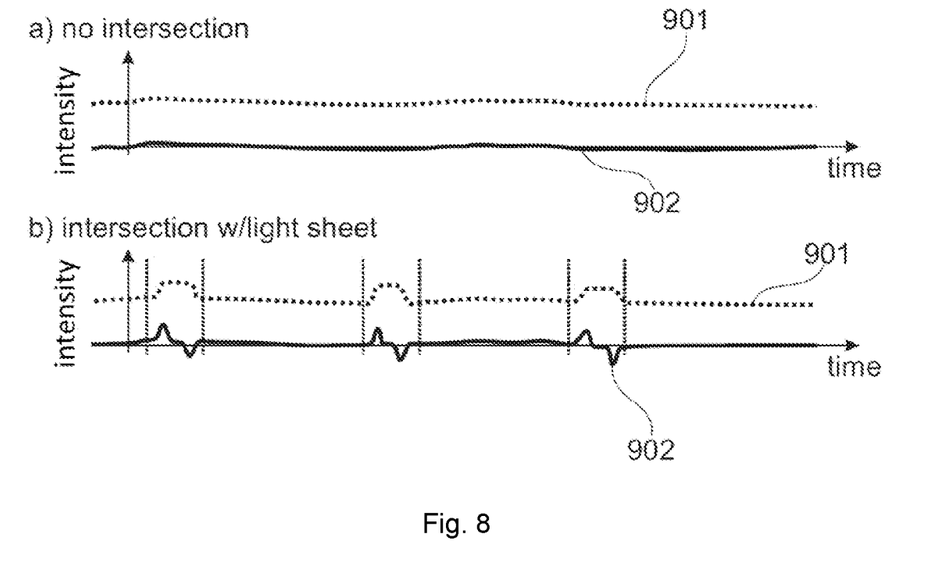
FIG. 8 schematically represents an example of an evolution of an intensity received by an LECD of any of FIGS. 6 and 7.

A schematic representation of the evolution of an intensity received by an LECD (e.g. the first LECD 305 of FIG. 6) with time, over which the rotor 115 and blades 120 rotate, may be depicted in FIG. 8. FIG. 8 illustrates a case a) wherein there is no intersection, i.e. interference, between a blade 120 and the light sheet 605. In such a case, a substantially constant value of intensity of received light may be measured. Line 901 depicts a plurality of unfiltered measurements whereas line 902 depicts a plurality of high pass filtered measurements. A high pass filter may be used to filter out the standard intensity measurements. By applying a high pass filter, the deviations with respect to the normal or default situation are registered and highlighted.

FIG. 8 also illustrates a case b) wherein a blade 120 has intersected with the light sheet 605, therefore causing a variation in the measurements of light intensity received as explained above. In case b) three blades 120—light sheet 605 interferences have been detected.

The duration of a different value of measured light intensity and/or the magnitude of the change in intensity may be correlated with the distance 407 between a blade 120 and the tower, and used to trigger actions to prevent blade 120 damage, e.g. collision of the blade 120 with the tower 170. Thus, an LECD or a processor coupled to the LECD may be configured to measure a time during which the emitted light is reflected by the blade 120.

Figure 7:
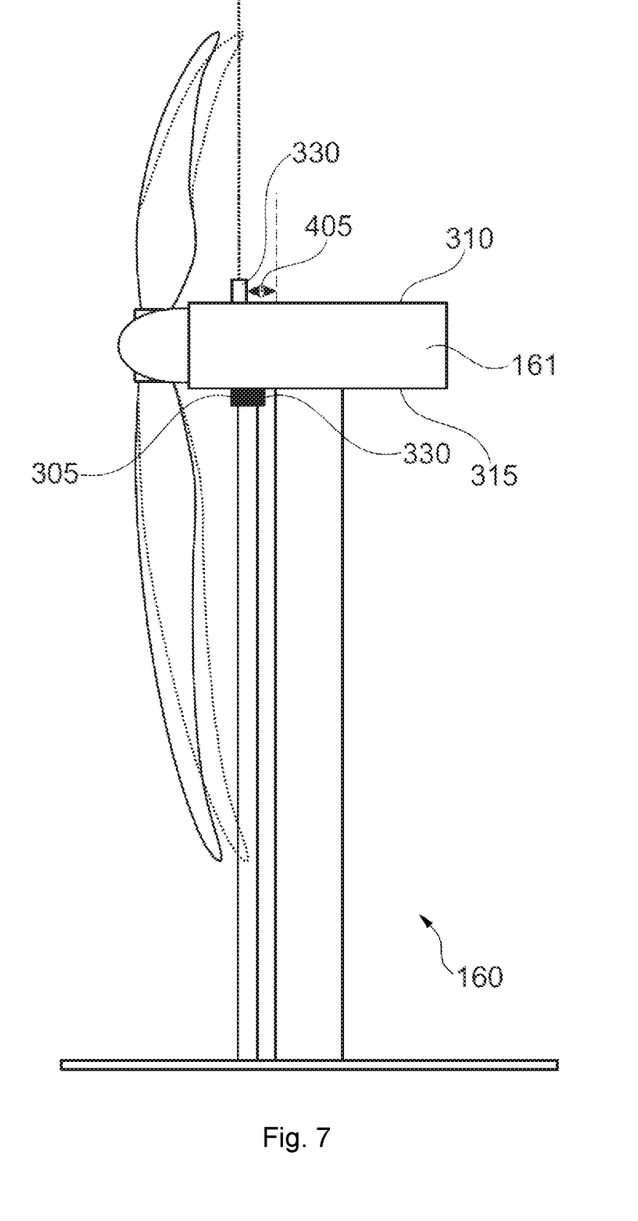
FIG. 7 schematically illustrates a side view of the wind turbine of FIG. 6.

As previously commented, a wind turbine 160 may further comprise an additional LECD 330. The additional LECD may be mounted to the top 310 or the bottom 315 of the nacelle 161 in some examples. Like the first LECD 305, the additional LECD may be configured to emit light in a direction within a substantially vertical plane, e.g. in a substantially vertical direction 415, and to collect a reflection of the emitted light by one of the rotor blades. In some examples, the first 305 and the additional 330 LECDs may be mounted to a same side of the nacelle 161. For instance, FIG. 7, which schematically illustrates a side view of the wind turbine of FIG. 6, shows a first 305 and an additional 330 LECDs mounted to a bottom 315 of the nacelle 161. In these or other examples, e.g. in FIGS. 3 and 4, the first 305 and the additional 330 LECDs may be mounted to opposite sides of the nacelle 161. FIG. 7 shows two additional LECDs 330, one mounted to the same side (bottom 315) and the other one mounted to the opposite side (top 310) than the first LECD 305.

When more than one LECD is mounted to a nacelle 161, an LECD may emit a light beam 325 or a light sheet 605 independently of what the other LECDs emit. I.e., all the LECDs of a set of LECDs may emit a light beam 325, may emit a light sheet 605, or some of them may emit a light beam 325 and some of them, different from the ones that may emit a light beam 325, may emit a light sheet 605.

Any of the blades 120 of a wind turbine as disclosed herein may include reflective paint at their tips 410. The reflective paint may help to increase the signal to noise (SNR) ratio of the light reflected by the blade tip 410.

When exposed to wind, a nacelle 161 and/or a wind turbine tower 170 may nod, i.e. oscillate in a forward-backward direction. This nodding may deviate light emitted by an LECD from a substantially vertical plane in the absence of loads on the wind turbine 160. Therefore, false alarms or indications that a blade 120 is overly deflected when the blade 120 is actually behaving acceptably may arise. The opposite may happen too, i.e. blade deflection may be excessive, but such a danger may be missed. This may be particularly relevant when an LECD may be emitting a light sheet 605.

Figure 9:
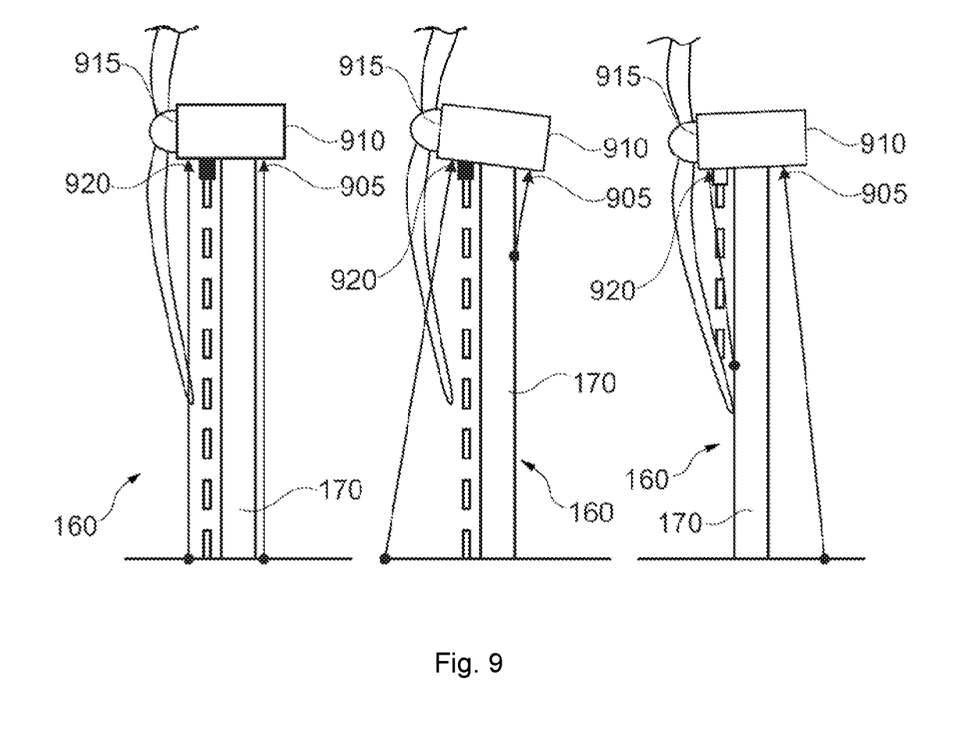
FIG. 9 schematically illustrates a side view of wind turbine according to another example.

A possible solution to this issue is depicted in FIG. 9. FIG. 9 schematically illustrates a side view of wind turbine including a light emitting and collecting device according to another example. The wind turbine 160 may comprise a first positioning sensor 905 (drawn as a triangle) attached to a bottom of the nacelle 161 and configured to detect a nodding of the nacelle 161 and/or the tower 170. The first LECD 305 may be configured to adjust the direction of the emitted light for keeping a direction of the emitted light within a substantially vertical plane. In some examples the first LECD 305 may be configured to adjust the direction of the emitted light for keeping a substantially vertical direction of the emitted light.

To this end, in some examples, the first LECD 305 may be rotatably mounted (to the nacelle 161) in such a way that light is emitted in a direction within a substantially vertical plane, and more in particular in a substantially vertical direction, when the nacelle oscillates. The movement of the first LECD 305 may be similar to that of a pendulum. In some of these examples, the first LECD 305 may be rotatably mounted to the nacelle 161 such that the LECD points substantially vertically downwards at all times, again like a pendulum. One or more LECDs may behave this way, e.g. one or more additional LECDs may be rotatable as just indicated.

The first positioning sensor 905 may be placed close to a back or downstream side 910 of the nacelle 161, as in FIG. 9. In other examples, it may be placed closest to a front or upstream side 915 of the nacelle 161. The positioning sensor 905 may measure a distance to the ground 320 or to any other reference. A reference value for this distance may be easily known by the positioning sensor 905. If the positioning sensor 905 measures a distance which differs from the reference value, this may be indicating nacelle 161 and/or tower 170 nodding.

In some examples, the variation in the values of distances measured by one or more positioning sensors (e.g. a first sensor 905 and an additional sensor 920 as in FIG. 9) may be used to rotate an LECD such that a substantially vertical direction of the emitted light may be kept.

In any of these examples or in some other examples, any values obtained by an inclinometer placed in the nacelle 161 may be used to adjust the direction of the emitted light. Measurements of thrust, rotor imbalance or blade 120 or main (rotor) shaft bending loads may be also used in this regard.

In some other examples, instead of rotating an LECD, the variation in the values of distances measured by one or more positioning sensors 905, 920 may be used to modify the information collected by the LECD 305.

In an example, a controller (not shown) in the nacelle 161 may gather information from an LECD 305 and a positioning device 905, 920 and may perform the necessary corrections in the information. In another example, the measurements of the positioning sensor 905, 920 may be sent to the LECD 305 such that the LECD makes the appropriate corrections.

Figure 10:
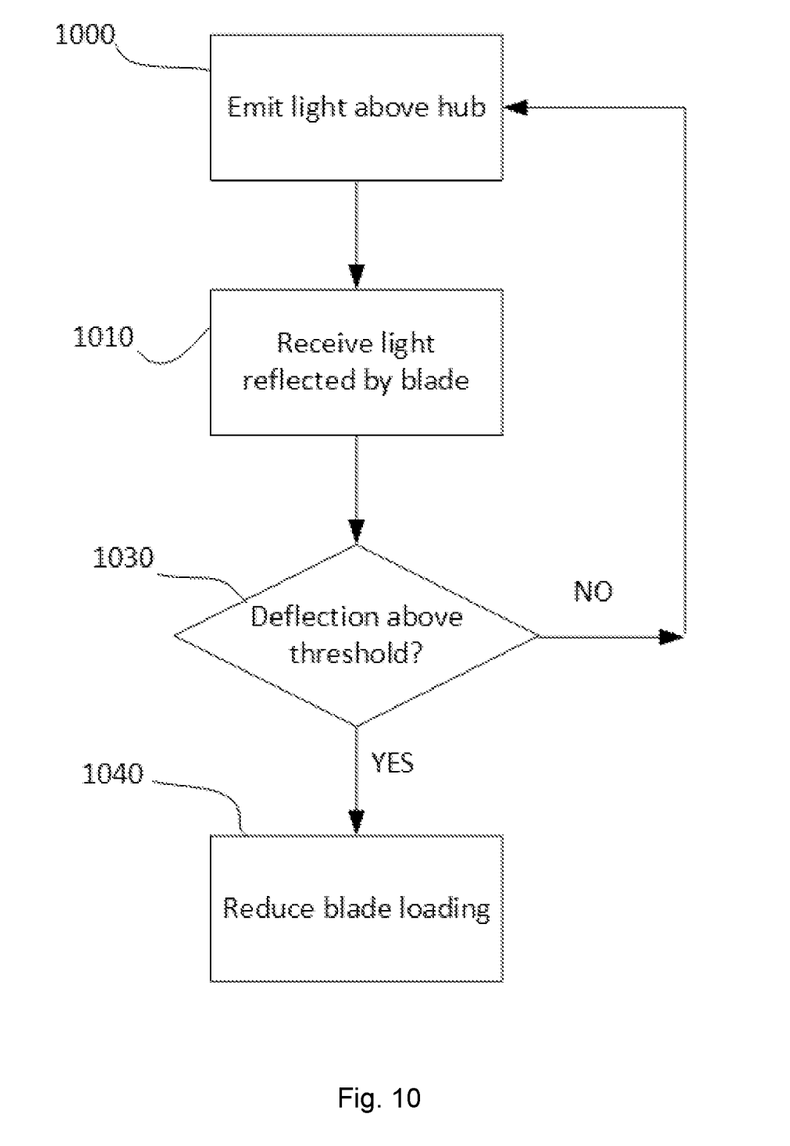
FIG. 10 schematically illustrates an example of a method for operating a wind turbine.

FIG. 10 schematically illustrates an example of a method for operating a wind turbine 160. In an aspect, a method for operating a wind turbine having a first light emitting and collecting device 305 mounted to a nacelle 161 is provided. The first LECD 305 may be mounted to a top of the nacelle 161 in some examples.

The method comprises emitting light above a hub of the wind turbine at block 1000. The method further comprises, at block 1010 receiving the light when reflected by a blade 120 of the wind turbine 160; i.e. receiving at least a portion of the previously emitted light which has been reflected by a blade 120. The method further comprises, if a level of blade deflection based on the received reflected light is above a threshold (block 1030), reducing blade loading of the blade 120 before the blade 120 reaches a vertically downward position at block 1040.

In some examples, the method may further include determining a level of blade deflection before testing whether a level of blade deflection based on the received reflected light is above a threshold at block 1030.

In some examples, reducing blade loading may include at least one of: reducing a rotor speed, pitching of one or more of the blades, and activating aerodynamic actuators if provided on the blade. Actuators on blades may include one or more of flaps, spoilers and pitching tips. Pitching of the blades may be individual (for a single blade) or collective (for all blades). Reducing a rotor speed may include changing a generator torque and/or mechanically braking in a case of emergency or severe disturbance. In some cases, reducing a rotor speed may include stopping operation of a wind turbine.

In some examples, the light may be emitted substantially in a direction within a substantially vertical plane, e.g. in a vertical direction. This may include emitting the light vertically downwards or vertically upwards as has been illustrated in previous examples. For instance, in one example, emitting light (block 1000) comprises emitting light (vertically) upwards from the nacelle 161. In other examples, the light may deviate with respect to a vertical plane.

In some examples, emitting light (block 1000) includes emitting a light sheet 605 and the level of blade deflection is determined based at least in part on a time that one of the blades 120 interferes with the light sheet 605. The explanation concerning FIG. 8 may apply.

In some examples, emitting light (block 1000) comprises emitting a substantially collimated light beam 325.

In some examples, the emitted light is in a region of the electromagnetic spectrum different than the visible region of the electromagnetic spectrum. This may reduce the visual impact for people and animals.

Also, a wavelength of the emitted light may be selected such that, after filtering the light received by a light sensor, the light corresponding to one or more reflections of the emitted light may be easily detected. In some examples, the emitted light is in a region of the electromagnetic spectrum different than the light emitted by the sun. This may be particularly helpful to avoid blinding of a light sensor by the sun.

In some examples, the first LECD 305 is configured to measure a distance 415 between the first LECD 305 and a position of a reflection. The explanation concerning FIG. 5 may apply.

Figure 11:
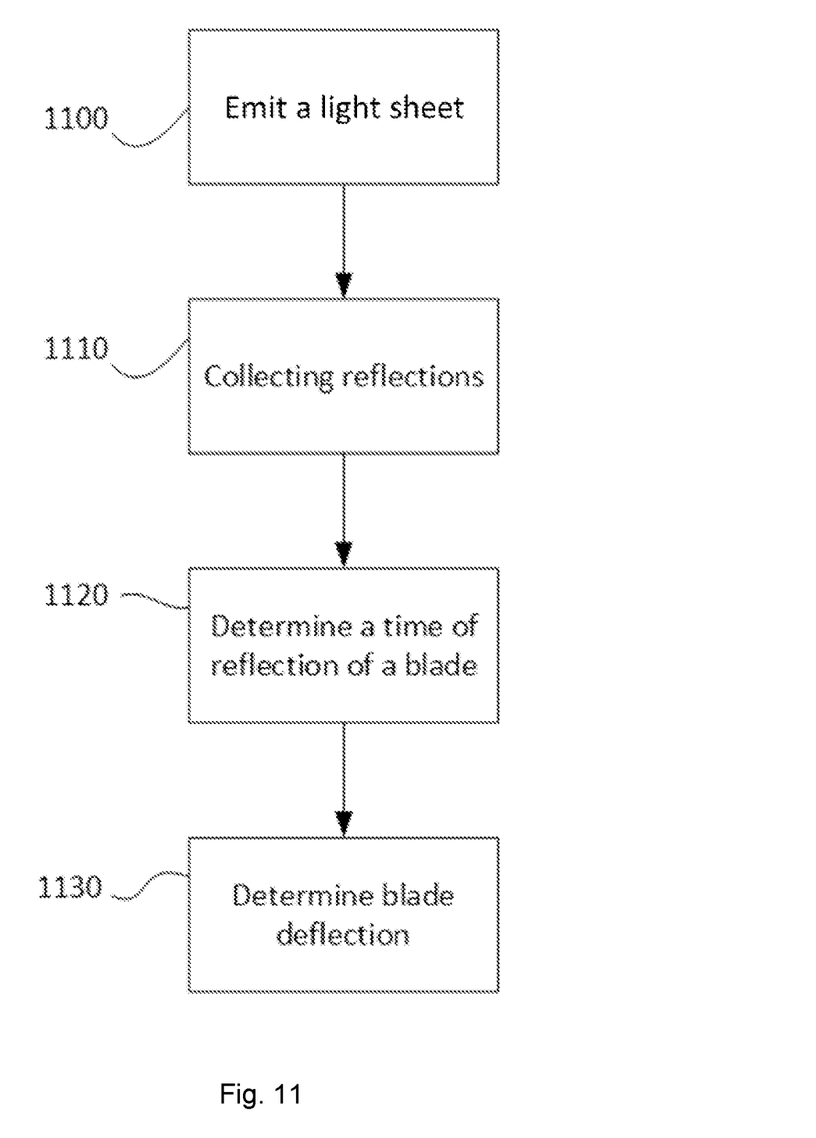
FIG. 11 schematically illustrates an example of a method for monitoring a deflection of a rotor blade in a wind turbine.

FIG. 11 schematically illustrates an example of a method of monitoring a deflection of a rotor blade of a wind turbine.

A first light emitting and collecting device 305 is mounted to the nacelle 161 of the wind turbine 160, e.g. to a top 310 or a bottom 315 of the nacelle 161. The method comprises emitting, at block 1100, a light sheet 605. The light sheet 605 may be emitted in a direction within a substantially vertical plane in some examples. In some of these examples, the light sheet 605 may be emitted in a substantially vertical direction, e.g. upwards or downwards. The method furthermore comprises collecting reflections of the emitted light at block 1110; and determining deflection of the rotor blade, at block 1130, by determining a time during which the blade 120 reflects the emitted light sheet (block 1120). The explanation concerning FIG. 8 may apply.

A speed of rotation of the rotor 115 may be used besides the time of interference with the light sheet 605 in order to determine deflection of the rotor blade 120. In some examples, more than one light sheet 605 may be emitted. This may enable obtaining multiple measurements regarding the portions of a blade 120 which may be interfering with the light sheets, e.g. positions of interference along a length of the blade 120. Therefore, the accuracy of blade deflection calculation may be increased e.g. if the rotor 115 does not maintain a substantially constant speed of rotation.

In some examples, the wind turbine may further comprise a positioning sensor 905, 920 attached to the nacelle 161 (e.g. as illustrated with reference to FIG. 9) and the method may further comprise determining a position and/or orientation of the nacelle 161. The position and/or orientation of the nacelle 161 may be taken into account when determining blade deflection.

In some examples, the first light emitting and collecting device 305 may be rotatably mounted to the nacelle 161 in such a way that light is emitted within a substantially vertical plane, and more in particular in a substantially vertical direction when the nacelle 161 oscillates.

In some examples, the wind turbine 160 may comprise one or more additional light emitting and collecting devices, e.g. an additional LECD 330, mounted the nacelle 161, e.g. to a top 310 or a bottom 315 of the nacelle 161, and determining deflection of the rotor blade 120 includes collecting reflections of the emitted light of the first 305 and additional 330 light emitting and collecting devices. The first 305 and additional 330 light emitting and collecting devices may e.g. be mounted on the same side of the nacelle 161 or on opposite sides.

In some examples, determining a time during which the blade 120 reflects the emitted light sheet 605, may include measuring a light intensity of light received by the first light emitting and collecting device 305. Particularly if the light is emitted above a hub 110, e.g. upwards, the intensity of light received may be a good measure for determining interference of a blade 120 with the light sheet 605.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine having a first light emitting and collecting device mounted to a nacelle, the method comprising:
    emitting light in a form of a light sheet above a hub of the wind turbine with the first light and collecting emitting device;
    with the first light emitting and collecting device, receiving the light reflected by a blade of the wind turbine;
    based on the received reflected light, determining that a level of blade deflection is above a threshold based on an amount of time the blade interferes with and reflects light from the light sheet exceeding a threshold time limit; and
    reducing blade loading of the blade before the blade reaches a vertically downward position.

2. The method of claim 1, wherein the step of reducing blade loading includes at least one of: reducing a rotor speed, pitching of one or more of the blades, and activating aerodynamic actuators.

3. The method of claim 1 wherein the step of emitting light comprises emitting the light sheet vertically above the hub.

4. The method of claim 1 wherein the step of emitting light comprises emitting the light sheet in an upwards direction from the nacelle.

5. The method according to claim 1, wherein the emitted light is in a region of an electromagnetic spectrum different than a visible region of the electromagnetic spectrum.

6. The method according to claim 1, wherein the first light emitting and collecting device is configured to measure a distance between the first light emitting and collecting device and a position of reflection of the light from the blade.

7. A method for monitoring deflection of a rotor blade of a wind turbine wherein a first light emitting and collecting device is mounted to the nacelle of the wind turbine, the method comprising:
    emitting a light sheet with the first, light emitting and collecting device in a vertically upwards direction from the nacelle;
    collecting reflections of the emitted light from the rotor blade with the first light and emitting and collecting device; and
    determining deflection of the rotor blade above a threshold value based on a time during which the blade reflects the emitted light sheet.

8. The method according to claim 7, wherein the wind turbine further comprises a positioning sensor attached to the nacelle and the method further comprises determining one or both of a position and an orientation of the nacelle.

9. The method according to claim 7, wherein the first light emitting and collecting device is rotatably mounted to the nacelle in such a way that light is emitted within a substantially vertical plane when the nacelle oscillates.

10. The method according to claim 7, wherein the wind turbine comprises an additional light emitting and collecting device mounted to the nacelle and the step of determining deflection of the rotor blade includes collecting reflections of the emitted light of the first and additional light emitting and collecting devices.

11. The method according to claim 7, wherein determining a time during which the blade reflects the emitted light sheet, includes measuring a light intensity of light received by the first light emitting and collecting device.

12. A wind turbine, comprising:
a tower;
a nacelle on top of the tower;
a rotor hub with one or more rotor blades rotatably mounted to the nacelle;
a first light emitting and collecting device mounted to the nacelle;
wherein the first light emitting and collecting device is configured to emit light in a form of a light sheet in an upwards direction from the nacelle and to collect a reflection of the emitted light by one of the rotor blades; and
wherein the first light emitting and collecting device is mounted to the nacelle at a horizontal distance of the tower such that a tip of a blade is detected before or when it exceeds a blade deflection limit that is based on an amount of time the rotor blade interferes with and reflects light from the light sheet.

13. The wind turbine according to claim 12, wherein the first light emitting and collecting device is configured to emit light in a vertical direction.

14. The wind turbine according to claim 12, further comprising a processor configured to measure a time during which the emitted light is reflected by the blade.

15. The wind turbine according to claim 12, wherein one or more of the rotor blades include reflective paint at their tips.

16. The wind turbine according to claim 12, wherein:
the first light emitting and collecting device is rotatably mounted in such a way that light is emitted in a direction within a substantially vertical plane when the nacelle oscillates.

17. The wind turbine according to claim 12, wherein the wind turbine comprises an additional light emitting and collecting device mounted to the nacelle on a same side of the nacelle as the first light emitting and collecting device.

* * * * *